(12) United States Patent
Sawatari et al.

(10) Patent No.: US 7,425,394 B2
(45) Date of Patent: *Sep. 16, 2008

(54) LIQUID CRYSTAL DISPLAY

(75) Inventors: Naoko Sawatari, Tokyo (JP); Masato Okabe, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 292 days.

This patent is subject to a terminal disclaimer.

(21) Appl. No.: 11/055,464

(22) Filed: Feb. 10, 2005

(65) Prior Publication Data
US 2005/0266177 A1    Dec. 1, 2005

(30) Foreign Application Priority Data
Feb. 10, 2004   (JP) .............................. 2004-033325

(51) Int. Cl.
*C09K 19/00*   (2006.01)
*C09K 19/52*   (2006.01)

(52) U.S. Cl. .......................... 430/20; 428/1.1; 428/1.2; 428/1.3

(58) Field of Classification Search ................ 428/1.2, 428/1.3, 1.1; 430/20
See application file for complete search history.

(56) References Cited

U.S. PATENT DOCUMENTS

2005/0233094 A1*   10/2005   Sawatari et al. ............. 428/1.1

OTHER PUBLICATIONS

Nonaka, T., Li, J., Ogawa, A., Hornung, B., Schmidt, W., Wingen, R., and Dubal, H., 1999, Liq. Cryst., 26, 1599., Fig 4.

* cited by examiner

*Primary Examiner*—Geraldina Visconti
(74) *Attorney, Agent, or Firm*—Seyfarth Shaw LLP

(57) ABSTRACT

A main object of the present invention is to provide a liquid crystal display using a ferroelectric liquid crystal, showing the mono-stability operation mode using a material showing the chiral smectic C phase via the smectic A phase in the temperature cooling process as the ferroelectric liquid crystal.

The present invention achieves the above-mentioned object by providing a liquid crystal display with a ferroelectric liquid crystal sandwiched between two substrates, wherein an electrode and a photo alignment layer are formed successively each on the surfaces of the substrates facing with each other, with the constituent materials for the above-mentioned photo alignment layers having compositions different with each other with the above-mentioned ferroelectric liquid crystal sandwiched therebetween, and the above-mentioned ferroelectric liquid crystal shows the chiral smectic C phase via the smectic A phase in the temperature cooling process, and it shows the mono-stability in the above-mentioned chiral smectic C phase.

17 Claims, 4 Drawing Sheets

LAYER NORMAL LINE

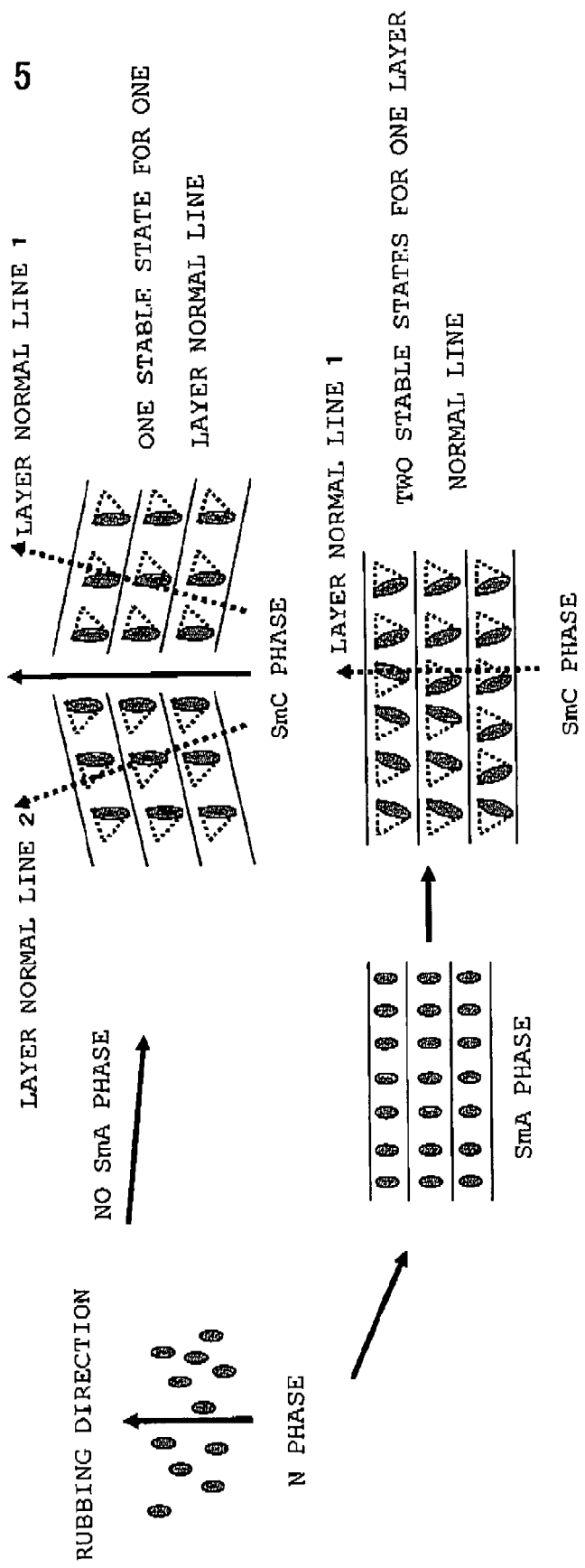

LIQUID CRYSTAL DISPLAY

BACKGROUND OF THE INVENTION

1. Field of the Invention

The present invention relates to liquid crystal display using ferroelectric liquid crystal, more specifically, liquid crystal display in which a photo alignment layer is used to control the alignment of ferroelectric liquid crystal.

2. Description of the Related Art

Since liquid crystal display has features that it is thin and is low in power consumption and other features, the use thereof has been expanding in various articles from large-sized displays to portable information terminals and the development thereof has been actively made. Conventionally, for liquid crystal display, a TN system, an STN multiplex driving system, an active matrix driving system in which thin film transistors (TFT) are used in TN, and others have been developed and made practicable. However, nematic liquid crystal is used therein; therefore, the response speed of the liquid crystal material is as small as several milliseconds to several tens of milliseconds and it cannot be said that these sufficiently cope with display of moving images.

Ferroelectric liquid crystal (FLC) exhibits a very short response time in order of microseconds, and thus FLC is a liquid crystal suitable for high-speed devices. About ferroelectric liquid crystal, there is well known a bistable liquid crystal which has two stable states when no voltage is applied thereto and is suggested by Clark and Lagerwall (FIG. 4). However, the liquid crystal has a problem that the liquid crystal has memory property but graduation display cannot be attained since the switching thereof is limited to two states, namely, bright and dark states.

In recent years, attention has been paid to ferroelectric liquid crystal in which the liquid crystal layer thereof is stable in a single state (hereinafter referred to as "monostable") when no voltage is applied thereto as a liquid crystal making it possible to attain graduation display by the matter that the director (the inclination of the molecule axis) of the liquid crystal is continuously changed by a change in applied voltage so as to analogue-modulate the light transmission thereof (NONAKA, T., LI, J., OGAWA, A., HORNUNG, B., SCHMIDT, W., WINGEN, R., and DUBAL, H., 1999, Liq. Cryst., 26, 1599., FIG. 4).

As the liquid crystal showing the mono-stability, in general, a ferroelectric liquid crystal having the phase change of cholesteric phase (Ch)-chiral smectic C (SmC*) phase without the transition to the smectic A (SmA) phase in the temperature cooling process is used.

On the other hand, as the ferroelectric liquid crystal, here is a material having the phase change of Ch-SmA-SmC* so as to show the SmC* phase via the SmA phase in the temperature cooling process. Among the ferroelectric liquid crystal material reported so far, most of them are those having such a phase sequence compared with the former material without the transition to the SmA phase. It is known that such a ferroelectric liquid crystal having such a phase sequence in general has two stable states with respect to one layer normal line so as to show the bi-stability (FIG. 5).

As a method for processing such ferroelectric liquid crystal for providing the mono-stability, a polymer stabilizing method can be presented. The polymer stabilizing method is a stabilization method by injecting a ferroelectric liquid crystal mixed with an ultraviolet curable monomer in a liquid crystal cell with the alignment process applied, and executing the ultraviolet ray irradiation in a state with the direct current or alternative current voltage applied for the polymerization. However, a problem is involved in that the production process is complicated and the driving voltage is made higher.

Moreover, in general, as the technique for subjecting liquid crystal to alignment process, there is known a method of using an alignment film. The method is classified into the rubbing method and the photo alignment method. The rubbing method is a method of subjecting a substrate coated with a polyimide film to rubbing treatment to align chains of the polyimide polymer in the direction of the rubbing, thereby aligning liquid crystal molecules on the film. The rubbing method is excellent in controllability of the alignment of nematic liquid crystal, and is generally an industrially applicable technique. However, according to this method, there are problems of the static electricity or dust generation, unevenness of the alignment limiting force or the tilt angle due to the rubbing condition difference, irregularity at the time of the large area process, or the like. Compared with the nematic liquid crystal, due to the high molecule order, the alignment control is difficult, and thus it is not suitable for the alignment processing method for the ferroelectric liquid crystal, which can easily generate the alignment defect.

As a non contact alignment method to take place of the above-mentioned rubbing method, a photo alignment method can be presented. The photo alignment method is for aligning the liquid crystal molecule of the film by directing a light beam with the polarization control to a polymer or a monomolecule for generating the photo excitation reaction (decomposition, isomerization, dimerization) so as to provide the anisotropy to the polymer film or the monomolecular film. This method is advantageous in that the quantitative alignment process can be controlled without generation of the static electricity or the dusts, which is the problem of the rubbing method. However, even by using this method, an example of realizing the mono-stability operation mode using the ferroelectric liquid crystal essentially having the bi-stability has not been found so far.

On the other hand, since the memory property is not provided in the case the ferroelectric liquid crystal shows the mono-stability, an active matrix drive wherein an active element such as a transistor and a diode is provided for each pixel is suitable. In particular, in the case an active matrix system using a TFT element as the active element is employed, since the purposed pixel can certainly be turned on or off, a high quality display can be realized, and thus it is advantageous.

In recent years, color liquid crystal display has been actively developed. The method for realizing color display is generally classified into a color filter system and a field sequential color system. The color filter system is a system of using a white light source as a back light and attaching a micro color filter in R, G or B color to each pixel, thereby realizing color display. On the other hand, the field sequential color system is a system of switching a back light into R, G, B, R, G, B . . . with time, and opening and shutting a black and white shutter of a ferroelectric liquid crystal in synchronization therewith to mix the colors with time by afterimage effect on the retina, thereby realizing color display. This field sequential color system makes it possible to attain color display in each pixel, and does not require any color filter low in transmission. As a result, this system is useful since the system is capable of attaining bright and highly precise color display and realizing low power consumption and low costs.

However, the field sequential color system is a system in which each pixel is subjected to time sharing; it is therefore necessary for the liquid crystal as the black and white shutter to have high-speed responsiveness in order to give a good moving image display property. If ferroelectric liquid crystal is used, this problem can be solved. However, the ferroelectric liquid crystal has a problem that alignment defects are easily generated, as described above. Furthermore, as the ferroelectric liquid crystal, those showing the mono-stability operation mode are desirable in order to enable the graduation display by the analog modulation and realize the highly precise color display as mentioned above. However, the ferroelectric liquid crystal materials showing the mono-stability are limited. Due to the narrow material selection range of the ferroelectric liquid crystal, it is difficult to cope with the various demanded characteristics, and thus they have not been provided for the practical use so far.

SUMMARY OF THE INVENTION

A main object of the present invention is to provide a liquid crystal display using a ferroelectric liquid crystal, showing the mono-stability operation mode using a material showing the chiral smectic C phase via the smectic A phase in the temperature cooling process as the ferroelectric liquid crystal.

As a result of the elaborate discussion of the present inventors in view of the above-mentioned circumstances, it was found out that the ferroelectric liquid crystal having the above-mentioned phase sequence shows the mono-stability operation mode by forming a photo alignment layer each on surfaces of two substrates facing with each other and using materials of different compositions for the above-mentioned photo alignment layers so as to complete the present invention.

That is, the present invention provides a liquid crystal display comprising a first photo aligned substrate having a first substrate, an electrode layer formed on the above-mentioned first substrate, and a first photo alignment layer formed on the above-mentioned electrode layer, and a second photo aligned substrate having a second substrate, an electrode layer formed on the above-mentioned second substrate, and a second photo alignment layer formed on the above-mentioned electrode layer, disposed so as to have the above-mentioned first photo alignment layer and the above-mentioned second photo alignment layer face with each other, with a ferroelectric liquid crystal sandwiched between the above-mentioned first photo alignment layer and the above-mentioned second photo alignment layer, wherein constituent materials for the above-mentioned first photo alignment layer and the above-mentioned second photo alignment layer are mutually different, and the above-mentioned ferroelectric liquid crystal shows a chiral smectic C phase via a smectic A phase in a temperature cooling process, and it shows a mono-stability in the above-mentioned chiral smectic C phase.

Since the first photo alignment layer and the second photo alignment layer having different compositions are used with the ferroelectric liquid crystal sandwiched therebetween in the liquid crystal display of the present invention, the effect of realizing the mono-stability operation mode using the ferroelectric liquid crystal showing the SmC* phase via the SmA phase in the temperature cooling process can be provided.

It is preferable that a constituent material for the above-mentioned first photo alignment layer is a photoreactive material and the first photo alignment layer shows an anisotropy by a photoreaction, and the constituent material for the above-mentioned second photo alignment layer is a photo isomerizable material including a photo isomerization-reactive compound and the second photo alignment layer shows the anisotropy by a photo isomerization reaction. Or it is preferable that the constituent materials for the above-mentioned first photo alignment layer and the above-mentioned second photo alignment layer are a photoreactive material and the above-mentioned photo alignment layers show the anisotropy by the photoreaction. By using a combination of such materials, the alignment controlling performance of the ferroelectric liquid crystal can be improved.

As the photoreactive material, the photoreaction is preferably a photo dimerization reaction or a photo decomposition reaction since the use of the photoreaction causes anisotropy to be easily given to the photo alignment layer.

Moreover, in the case the constituent materials for the above-mentioned first photo alignment layer and the above-mentioned second photo alignment layer are the above-mentioned photoreactive materials, it is preferable that the constituent material for the above-mentioned first photo alignment layer is a photoreactive material and the first photo alignment layer show the anisotropy by a photo dimerization reaction, and the constituent material for the above-mentioned second photo alignment layer is a photoreactive material and the second photo alignment layer show the anisotropy by an photo decomposition reaction.

The above-mentioned photo alignment layer shows the anisotropy by the photo dimerization reaction and the photoreactive material preferably comprises a photo dimerization-reactive compound having a radical-polymerizable functional group and a dichroism having different absorptions according to a polarization direction thereof since anisotropy can easily be given to the photo alignment layer by radical-polymerizing its reactive sites aligned in the polarization direction.

The photo dimerization-reactive compound is preferably a dimerization-reactive polymer containing, as its side chain, any one of a cinnamic acid ester, a coumalin, and a quinoline since anisotropy can easily be given to the photo alignment layer by the radical polymerization in the state that the double bonds in the α, β-unsaturated ketone aligned in parallel to the polarization direction function as reactive sites.

The photo dimerization-reactive compound is preferably at least one selected from a group of dimerization-reactive polymers represented by the following formulae:

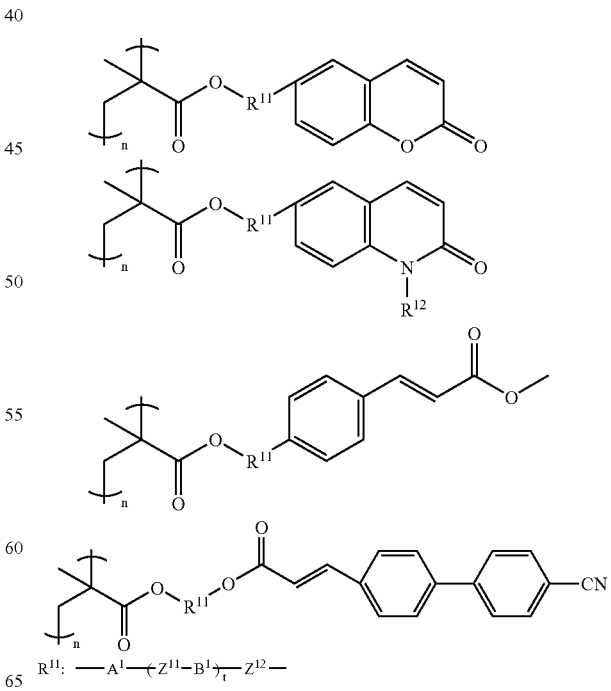

wherein $A^1$ and $B^1$: 1,4-phenylene, a covalent single bond, pyridine-2,5-diyl, pyrimidine-2,5-diyl, 1,4-cyclohexylene or 1,3-dioxane-2,5-diyl;

$Z^{11}$ and $Z^{12}$: —CH$_2$—CH$_2$—, —COO—, —OOC—, or a covalent single bond; and t: an integer of 0 to 4.

$R^{12}$: a lower alkyl n: an integer of 4 to 30,000

This is because the dimerization-reactive polymer is small in energy necessary for the reaction thereof and functional groups suitable for the moieties $R^{11}$ and $R^{12}$ can be selected.

The photo isomerization-reactive compound is preferably a compound which has a dichroism having different absorptions according to a polarization direction thereof and further generates the photo isomerization reaction by a light irradiation since anisotropy can easily be given to the photo alignment layer by causing the isomerization of its reactive sites aligned in the polarization direction of the photo isomerization-reactive compound having such properties.

For the photo isomerization-reactive compound, the photo isomerization reaction is preferably a cis-trans isomerization reaction since any one of a cis-isomer and a trans-isomer increases by the light irradiation, whereby anisotropy can be given to the photo alignment layer.

The photo isomerization-reactive compound is preferably a compound having, in a molecule thereof, an azobenzene skeleton for the following reason: any azobenzene skeleton is subjected to the cis-trans isomerization reaction by the light irradiation; therefore, when the compound having, in the molecule thereof, an azobenzene skeleton is contained as the constituent material of the photo alignment layer, anisotropy can easily be given to the photo alignment layer. This is also for the following reason: when the compound has the azobenzene skeleton, the anisotropy given to the photo alignment layer is particularly suitable for controlling the alignment of the ferroelectric liquid crystal.

It is preferable that the above-mentioned photo isomerization-reactive compound is at least one selected from the group consisting of the isomerization-reactive monomolecular compounds represented by the below-mentioned formula.

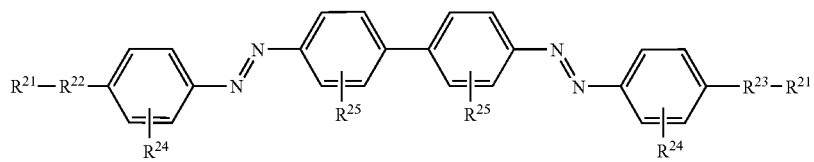

wherein $R^{21}$s each independently represent a hydroxyl group; $R^{22}$ represents a linking group represented by -(α-β-α)$_g$-(γ)$_h$- and $R^{23}$ represents a linking group represented by -(γ)$_h$-(α-β-α)$_g$-, wherein α represents a bivalent hydrocarbon group, β represents —O—, —CO—O—, —OCO—, —CONH—, —NHCO—, —NHCO—O— or —OCONH—, g represents an integer of 0 to 3, γ represents a bivalent hydrocarbon group when g is 0 and represents —O—, —CO—O—, —OCO—, —CONH—, —NHCO—, —NHCO—O— or —OCONH— when g is an integer of 1 to 3, and h represents 0 or 1; $R^{24}$s each independently represent a halogen atom, a carboxyl group, a halogenated methyl group, a halogenated methoxy group, a cyano group, a nitro group, a methoxy group, or a methoxycarbonyl group provided that the carboxyl group may be combined with an alkali metal to form a salt; and $R^{25}$s each independently represent a carboxyl group, a sulfo group, a nitro group, an amino group or a hydroxyl group provided that the carboxyl group or the sulfo group may be combined with an alkali metal to form a salt.

The photo isomerization-reactive compound is a polymerizable monomer having, as its side chain, an azobenzene skeleton since anisotropy can easily be given to the photo alignment layer and the anisotropy can be made stable when the polymerizable monomer having, as its side chain, an azobenzene skeleton contained as the constituent material of the photo alignment layer.

It is preferable that the above-mentioned photo isomerization-reactive compound is at least one selected from the group consisting of the isomerization-reactive polymerizable monomolecular compounds represented by the below-mentioned formula.

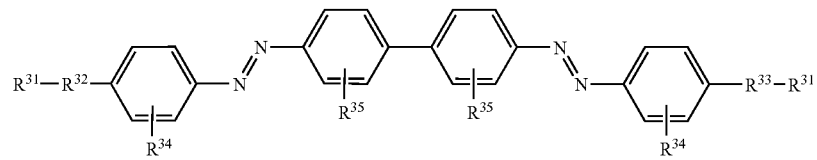

wherein $R^{31}$s each independently represent a (meth)acryloyloxy group, a (meth)acrylamide group, a vinyloxy group, a vinyloxycarbonyl group, a vinyliminocarbonyl group, a vinyliminocarbonyloxy group, a vinyl group, an isopropenyloxy group, an isopropenyloxycarbonyl group, an isopropenyliminocarbonyl group, an isopropenyliminocarbonyloxy group, an isopropenyl group or an epoxy group; $R^{32}$ represents a linking group represented by -(α-β-α)$_g$-(γ)$_h$- and $R^{33}$ represents a linking group represented by -(γ)$_h$-(α-β-α)$_g$- wherein α represents a bivalent hydrocarbon group, β represents —O—, —CO—O—, —OCO—, —CONH—, —NHCO—, —NHCO—O— or —OCONH—, g represents an integer of 0 to 3, γ represents a bivalent hydrocarbon group when g is 0 and represents —O—, —CO—O—, —OCO—, —CONH—, —NHCO—, —NHCO—O— or —OCONH— when g is an integer of 1 to 3, and h represents 0 or 1; $R^{34}$s each independently represent a halogen atom, a carboxyl group, a halogenated methyl group, a halogenated methoxy group, a cyano group, a nitro group, a methoxy group, or a methoxycarbonyl group provided that the carboxyl group may be combined with an alkali metal to form a salt; and $R^{25}$s each independently represent a carboxyl group, a sulfo group, a nitro group, an amino group or a hydroxyl group provided that the carboxyl group or the sulfo group may be combined with an alkali metal to form a salt.

The ferroelectric liquid crystal is preferably a ferroelectric liquid crystal which constitutes a single phase. In the liquid crystal display of the invention, a good alignment can be obtained even if the single-phase ferroelectric liquid crystal is used. Therefore, in order to control the alignment, it is unnecessary to use the polymer stabilizing method or the like. Thus, the invention has advantages that the process for the production of the display element becomes simple and the driving voltage thereof can be made low.

The liquid crystal display is preferably driven by an active matrix system using thin film transistors (TFT) since the adoption of the active matrix system using TFT elements makes it possible to switch on or off target pixels surely to give high-quality display. Furthermore, it is possible to combine a TFT substrate, in which TFT elements are arranged in a matrix form on one of the substrates, with a common electrode substrate, in which a common electrode is formed in the whole of the display section of the other substrate, form a micro color filter in which TFT elements are arranged in a matrix form between the common electrode of the common electrode substrate and the substrate thereof, and use the resultant as color liquid crystal display.

The liquid crystal display is preferably driven by a field sequential color system. Since the above-mentioned liquid crystal display has a high response speed, the ferroelectric liquid crystal can be aligned without generating the alignment defect, and furthermore, since it shows the mono-stability operation mode, the graduation display can be enabled. Therefore, when the display element is driven by the field sequential color system, bright and highly precise display of color moving images which has a wide view angle can be realized at low costs and low power consumption.

BRIEF DESCRIPTION OF THE DRAWINGS

FIG. 5 is a view illustrating a difference of alignment defects based on a difference of the phase series that ferroelectric liquid crystal has.

DESCRIPTION OF THE PREFERRED EMBODIMENT

Figure 3:
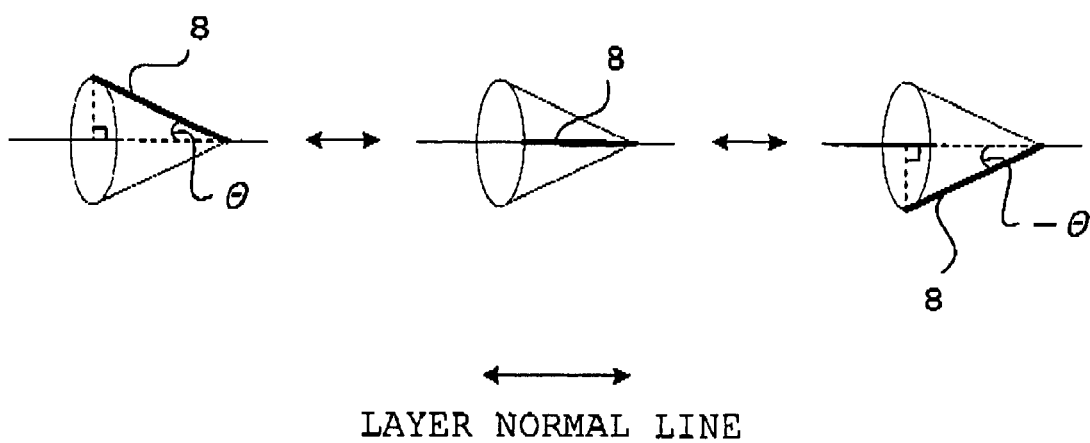
FIG. 3 is a schematic diagram showing the behavior of the ferroelectric liquid crystal molecule.
Figure 4:
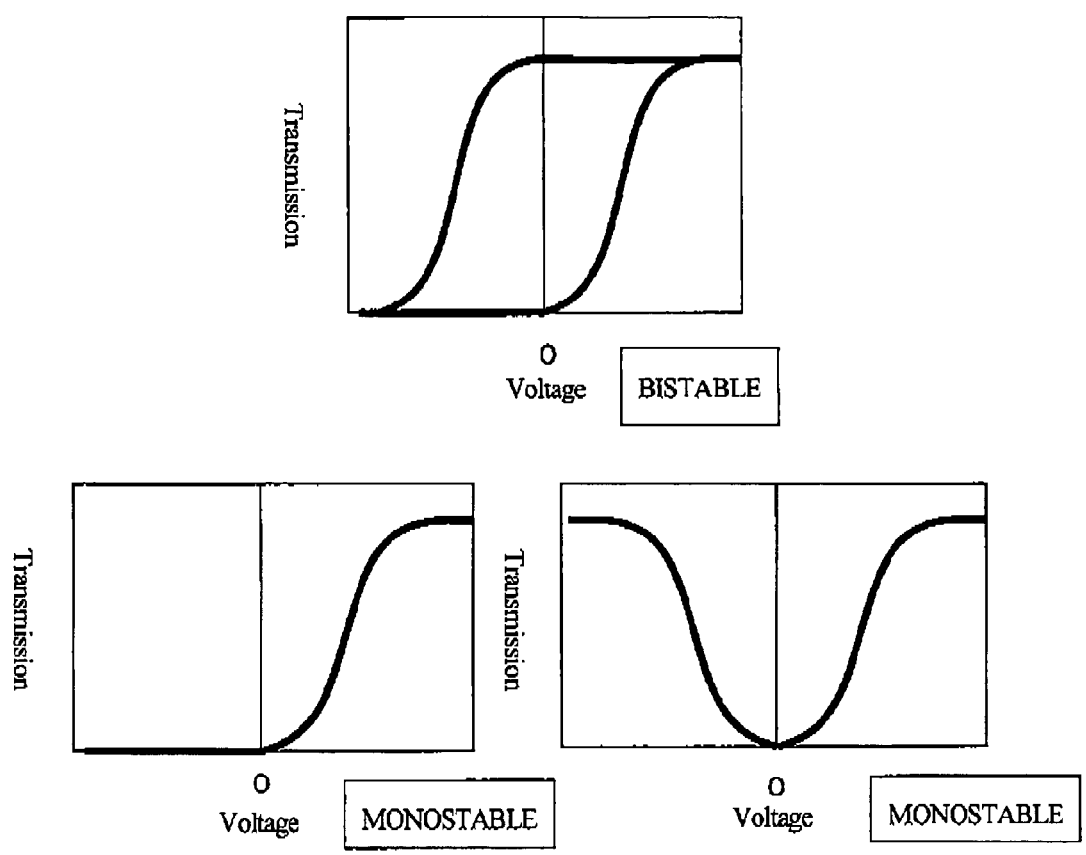
FIG. 4 is a graph showing changes in transmission as a function of voltage applied to ferroelectric liquid crystals.

The liquid crystal display of the present invention will be described in detail hereinafter. The liquid crystal display of the present invention provides a liquid crystal display comprising a first photo aligned substrate having a first substrate, an electrode layer formed on the above-mentioned first substrate, and a first photo alignment layer formed on the above-mentioned electrode layer, and a second photo aligned substrate having a second substrate, an electrode layer formed on the above-mentioned second substrate, and a second photo alignment layer formed on the above-mentioned electrode layer, disposed so as to have the above-mentioned first photo alignment layer and the above-mentioned second photo alignment layer face with each other, with the ferroelectric liquid crystal sandwiched between the above-mentioned first photo alignment layer and the above-mentioned second photo alignment layer, wherein the constituent materials for the above-mentioned first photo alignment layer and the above-mentioned second photo alignment layer are mutually different, and the above-mentioned ferroelectric liquid crystal shows the chiral smectic C phase via the smectic A phase in the temperature cooling process, and it shows the mono-stability in the above-mentioned chiral smectic C phase. Here, "to show the mono-stability" denotes a state wherein the liquid crystal layer without the voltage application is stabilized as mentioned above. More specifically, as shown in FIG. 3, the ferroelectric liquid crystal molecule 8 having two stable states inclined by an angle only for a tilt angle ±θ with respect to the layer normal, is capable of moving on a cone between the two stable states. It denotes the state wherein the ferroelectric liquid crystal molecule 8 is stabilized in either one state on the above-mentioned cone at the time without the voltage application.

Figure 1:
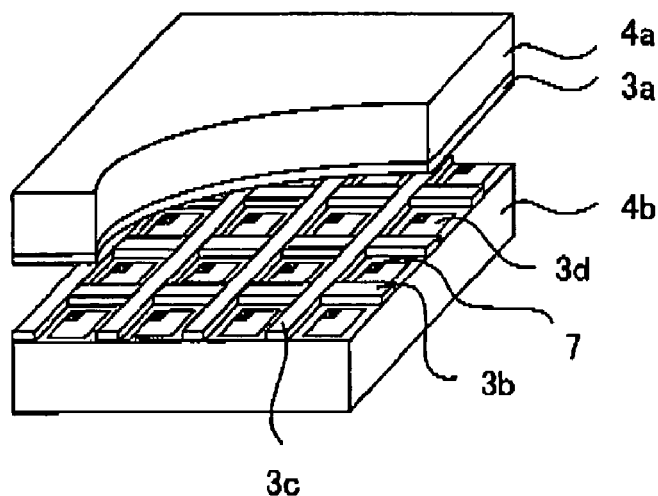
FIG. 1 is a schematic perspective view illustrating one example of the liquid crystal display of tie present invention.
Figure 2:
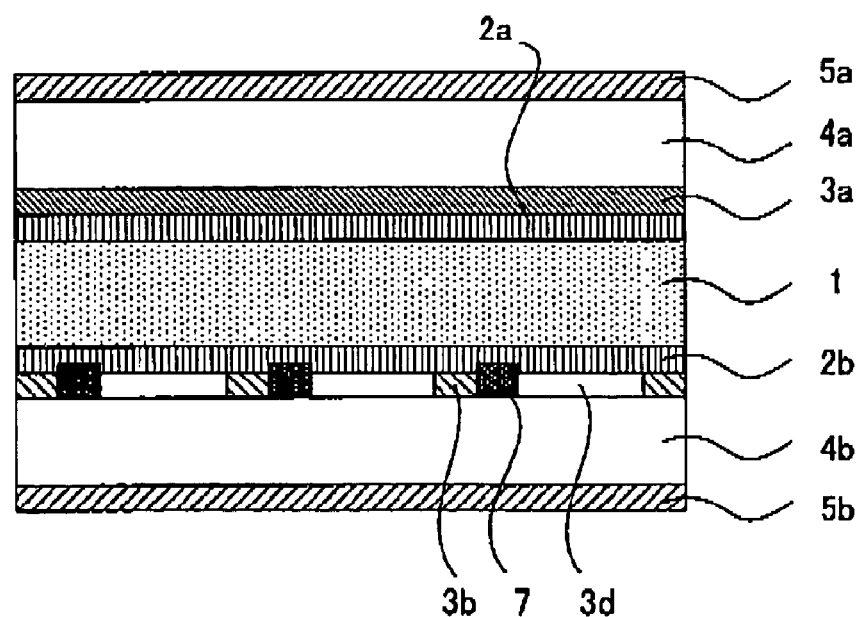
FIG. 2 is a schematic sectional view illustrating the example of the liquid crystal display of the present invention.

The liquid crystal display of the invention will be described with reference to the drawings. FIG. 1 is a schematic perspective view illustrating one example of the liquid crystal display of the present invention. FIG. 2 is a schematic sectional view thereof. As shown in FIGS. 1 and 2, a common electrode 3a is formed on a substrate 4a, and x electrodes 3b, y electrodes 3c and pixel electrodes 3d are formed on an opposite substrate 4b. Inside an electrode layer that these electrodes constitute are formed photo alignment layers 2a and 2b. A ferroelectric liquid crystal is sandwiched between the photo alignment layers 2a and 2b to constitute a liquid crystal layer 1. In FIG. 1, the illustration of photo alignment layers 2a and 2b is omitted.

Polarizing plates 5a and 5b may be formed outside of the substrates 4a and 4b. This makes it possible to convert incident light into linear polarized light so that the display can transmit only light polarized in the alignment direction of molecules of the liquid crystal. The polarizing plates 5a and 5b are arranged in such a manner that the polarization direction thereof is twisted at 90°. This makes it possible to control the direction of the optical axis of the liquid crystal molecules or the magnitude of the birefringence of the liquid crystal molecules between states that voltage is not applied thereto and is applied thereto, and produce a bright state and a dark state by use of the ferroelectric liquid crystal molecules as a black and white shutter. For example, in the state that no voltage is applied, the light transmitted through the polarizing plate 5a cannot be caused to rotate its polarization direction at an angle of 90° by setting the polarizing plate 5a to make consistent with the alignment of the liquid crystal molecules. Consequently, this light is blocked by the polarizing plate 5b so that the liquid crystal is turned into a dark state. On the other hand, in the state that voltage is applied, the direction of the liquid crystal molecules are changed by the voltage so that the optical axis thereof rotates by an angle θ from the initial state, whereby the polarization direction of the light is twisted at 90°. As a result, the light is transmitted through the polarizing plate 5b so that the liquid crystal is turned into a bright state. When the quantity of the transmitted light is controlled in accordance with the applied voltage, graduation display can be attained.

Accordingly, since the liquid crystal display of the present invention have a photo alignment layer each on the surfaces facing with each other of the upper and lower substrates and the above-mentioned photo alignment layers are made of materials of compositions different with each other with the ferroelectric liquid crystal sandwiched therebetween, the mono-stability operation mode can be realized using a ferroelectric liquid crystal having the phase change to the SmC* phase via the SmA phase in the temperature cooling process. According to a ferroelectric liquid crystal having such a phase sequence, the layer interval of the smectic layer is shortened in the phase change process so as to have a chevron structure with the smectic layer bent for compensating the volume change. According to the bent direction, a domain having a different longer axis direction of the liquid crystal molecule is formed so as to easily generate the alignment defect called the zigzag defect or the hairpin defect in the boundary surface. However, according to the present invention, since the ferroelectric liquid crystal can be aligned without generating such an alignment defect, it is advantageous in that the contrast deterioration by the light leakage can be prevented.

As shown in, for example, FIG. 1, the liquid crystal display of the present invention is preferably a display in which one of the substrates is rendered a TFT substrate in which thin film transistors (TFT elements) are arranged in a matrix form, the other substrate is rendered a common electrode substrate having the common electrode formed on the whole area thereof and the two substrates are combined with each other. Such liquid crystal display of an active matrix system using TFT elements will be described hereinafter.

In FIG. 1, in one of the substrates, its electrode is the common electrode 3a, and thus the substrate is a common electrode substrate. On the other hand, in the opposite substrate, its electrodes are composed of the x electrodes 3b, the y electrodes 3c and the pixel electrodes 3d, and thus the substrate is a TFT substrate. In this liquid crystal display, the x electrodes 3b and the y electrodes 3c are arranged lengthwise and crosswise, respectively. When signals are added to these electrodes, the TFT elements 7 are worked so as to drive the ferroelectric liquid crystal. Although it is not shown in the figure, the intersection portions of the x electrodes 3b and the y electrodes 3c are insulated with an insulating layer so that the signals of the x electrodes 3b and the signals of the y electrodes 3c can be operated independently. Any region surrounded by the x electrodes 3b and the y electrodes 3c is a pixel, which is a minimum unit for driving the liquid crystal display of the invention. At least one out of the TFT elements 7 and at least one out of the pixel electrodes 3d are fitted to each of the pixels. In the liquid crystal display of the invention, the TFT elements 7 of the respective pixels can be worked by applying signal voltages successively to the x electrodes 3b and the y electrodes 3c.

Furthermore, the liquid crystal display of the invention can be used as a color liquid crystal display by forming a micro color filter in which TFT elements 7 are arranged in a matrix form between the common electrode 3a and the substrate 4a. Each of the constituent members of the liquid crystal display of the invention, as described above, will be described in detail hereinafter.

1. Constituent Members of the Liquid Crystal Display (1) Photo Alignment Layer

The photo alignment layer aligns the liquid crystal molecule on the layer by its anisotropy which is given by irradiating light beam with polarization controlled onto a substrate coated with the constituent materials of the photo alignment layer, which is to be described later, so as to generate the photo excitation reaction (decomposition, isomerization, dimerization).

The constituent material of the photo alignment layer used in the invention is not limited to any especial kind if the material has an effect of generating photo-excited reaction by the light irradiation to align the ferroelectric liquid crystal thereon (photoaligning). Such a material can be roughly classified into an optically isomerizable type, in which only the shape of the molecule thereof changes so that the alignment thereof can reversibly change, and a photoreactive type, in which the molecule itself thereof changes. In the invention, the constituent materials of the upper and lower photo alignment layers are not limited to any especial material if the compositions of the materials are different from each other. Thus, it is permissible to combine a material of the photoreactive type with that of the optically isomerizable type, or use either of a material of the photoreactive type or that of the optically isomerizable type to make the compositions of the upper and lower photo alignment layers different.

Among these examples, as the first embodiment, it is preferable that the constituent material for the above-mentioned first photo alignment layer is a photoreactive material and the above-mentioned photo alignment layer shows the anisotropy by the photoreaction, and the constituent material for the above-mentioned second photo alignment layer is a photo isomerizable material including a photo isomerization-reactive compound and the above-mentioned photo alignment layer shows the anisotropy by the photo isomerization reaction. Moreover, as the second embodiment, it is preferable that the constituent materials for the above-mentioned first photo alignment layer and the above-mentioned second photo alignment layer are a photoreactive material and the above-mentioned photo alignment layer show the anisotropy by the photoreaction. By using a combination of such materials, the alignment controlling performance of the ferroelectric liquid crystal can be improved. The wavelength range of the light beam for generating the photo excitation reaction of the constituent materials of the above-mentioned photo alignment layer is preferably in an ultraviolet ray range, that is, in a range of 10 to 400 nm, and it is more preferably in a range of 250 to 380 nm. Hereinafter, the first photo alignment layers and the second photo alignment layers of the first embodiment and the second embodiment will be explained, respectively.

a. First Embodiment (First Photo Alignment Layer)

As described above, the first photo alignment layer used in the present embodiment is preferably a photoreactive material which generates photoreaction to give anisotropy to the photo alignment layer.

The photoreaction is not limited to any especial kind if the reaction can change the molecule itself by the light irradiation to give anisotropy to the photoaligning of the photo alignment layer. Photo dimerization reaction and photo decomposition reaction are more preferable since the anisotropy of the photo alignment layer is obtained easier. The photo dimerization reaction is a reaction that two molecules are polymerized by radical polymerization of their reactive sites aligned in the direction of polarization through the light irradiation. This reaction makes it possible to stabilize the alignment in the polarization direction to give anisotropy to the photo alignment layer. On the other hand, the photo decomposition reaction is a reaction which decomposes a molecule chain of polyimide or the like which is aligned in the direction of polarization by the light irradiation. This reaction makes it possible to give anisotropy to the photo alignment layer in the state that the molecule chain aligned in the direction perpendicular to the polarization direction remains. Examples of the photoreactive material using the photo decomposition reaction include such as a polyimide "RN 1199" manufactured by NISSAN CHEMICAL INDUSTRIES, LTD. It is more preferable in the invention to use, out of these photoreactive materials, materials which give anisotropy to the photo alignment layer by the photo dimerization reaction since the materials are high in exposure sensitivity and the scope of material-selection is wide.

The photoreactive material using photo dimerization reaction is not limited to any especial kind if the material can give anisotropy to the photo alignment layer by photo dimerization reaction. The material preferably comprises a photo dimerization-reactive compound having a radical-polymerizable functional group and a dichroism having different absorptions according to the polarization direction thereof since the alignment of the photo dimerization-reactive compound is stabilized and anisotropy can easily be given to the photo alignment layer by radical-polymerizing its reactive sites aligned in the polarization direction.

Examples of the photo dimerization-reactive compound include dimerization-reactive polymers each having, as its side chain, at least one reactive site selected from a cinnamic acid ester, a coumalin, a quinoline, a chalcone group and a cinnamoyl group.

Of these, the following is preferred as the photo dimerization-reactive compound having such properties: a dimerization-reactive polymer having, as its side chain, any one of a cinnamic acid ester, a coumalin and a quinoline. This is because the compound is radical-polymerized in the state that the double bonds in the α, β-unsaturated ketone aligned in the polarization direction function as reactive sites, whereby anisotropy can easily be given to the photo alignment layer.

The main chain of the dimerization-reactive polymer is not limited to any especial kind if the main chain is a chain that is generally known as a polymer main chain, and is preferably a chain which does not have a substituent containing many π electrons, which hinder interactions between the reactive sites of the above-mentioned side chain, an example of the substituent being an aromatic hydrocarbon group.

The weight-average molecular weight of the dimerization-reactive polymer is not especially limited, and is preferably from 5,000 to 40,000, more preferably from 10,000 to 20,000. The weight-average molecular weight can be measured by gel permeation chromatography (GPC). If the weight-average molecular weight of the dimerization-reactive polymer is too small, an appropriate anisotropy may not be given to the photo alignment layer. Conversely, if it is too large, the viscosity of the coating solution at the time of the formation of the photo alignment layer is so high that a homogeneous coat film may not easily be formed.

As the dimerization-reactive polymer, a compound represented by the following formula (1) can be illustrated:

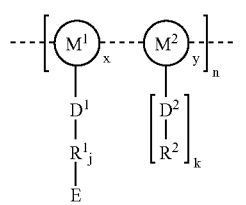

In the formula (1), $M^1$ and $M^2$ each independently represent a monomer unit of a homopolymer or a copolymer. Examples thereof include ethylene, acrylate, methacrylate, 2-chloroacrylate, acrylamide, methacrylamide, 2-chloroacrylamide, styrene derivatives, maleic acid derivatives, and siloxane. $M^2$ may be acrylonitrile, methacrylonitrile, methacrylate, methyl methacrylate, hydroxyalkyl acrylate or hydroxyalkyl methacrylate. x and y each represent the mole ratio of each of the monomer units when the units are polymerized into a copolymer, and are each a number satisfying: 0<x≦1, 0≦y<1, and x+y=1. n represents an integer of 4 to 30,000. $D^1$ and $D^2$ each represent a spacer unit.

$R^1$ is a group represented by $-A-(Z^1-B)_z-Z^2-$, and $R^2$ is a group represented by $-A-(Z^1-B)_z-Z^3-$, wherein A and B each independently represent a covalent single bond, pyridine-2, 5-diyl, pyrimidine-2,5-diyl, 1,4-cyclohexylene, 1,3-dioxane-2,5-diyl, or 1,4-phenylene which may have a substituent; $Z^1$ and $Z^2$ each independently represent a covalent single bond, —CH$_2$—CH$_2$—, —CH$_2$O—, —OCH$_2$—, —CONR—, —RNCO—, —COO— or —OOC—, wherein R is a hydrogen atom or a lower alkyl group; $Z^3$ is a hydrogen atom, an alkyl or alkoxy which has 1 to 12 carbon atoms and may have a substituent, cyano, nitro or halogen; z is an integer of 0 to 4; E represents an optically dimerization-reactive site, examples of which include a cinnamic acid ester, a coumalin, a quinoline, a chalcone group and a cinnamoyl group; and j and k are each independently 0 or 1.

More preferable examples of this dimerization-reactive polymer include compounds represented by the following formulae:

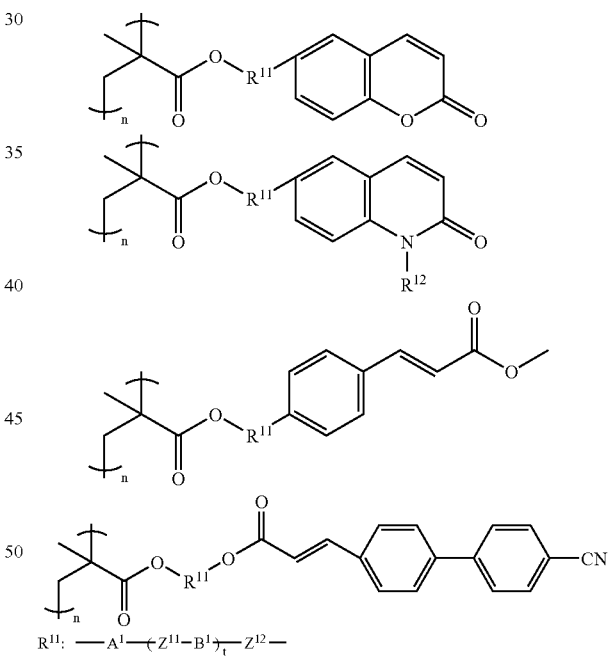

$R^{11}$: —A$^1$—(Z$^{11}$—B$^1$)$_t$—Z$^{12}$— wherein A$^1$ and B$^1$: 1,4-phenylene, a covalent single bond, pyridine-2,5-diyl, pyrimidine-2,5-diyl, 1,4-cyclohexylene or 1,3-dioxane-2,5-diyl;

$Z^{11}$ and $Z^{12}$: —CH$_2$—CH$_2$—, —COO—, —OOC—, or a covalent single bond; and t: an integer of 0 to 4.

$R^{12}$: a lower alkyl n: an integer of 4 to 30,000

Of the above-mentioned dimerization-reactive polymers, particularly preferable is at least one of compounds 1 to 4 represented by the following formulae:

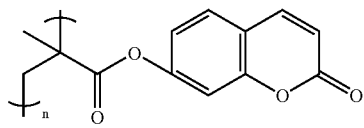

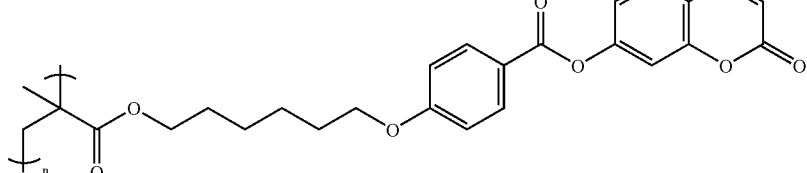

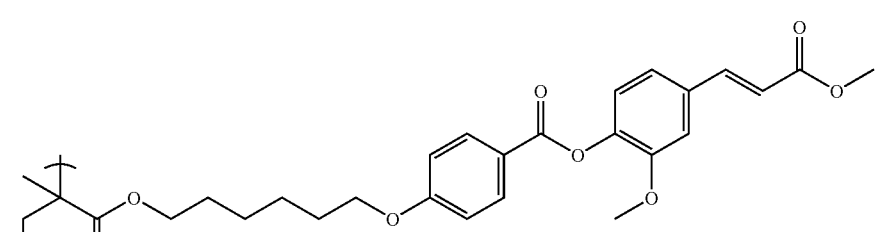

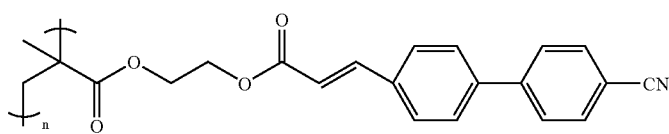

In the present embodiment, an optically dimerization-reactive site or substituent can be variously selected as the photo dimerization-reactive compound from the above-mentioned compounds in accordance with required properties. One kind of the photo dimerization-reactive compound may be used alone or a combination of two or more kinds thereof can be used.

The photoreactive material using photo dimerization reaction may contain additives besides the above-mentioned photo dimerization-reactive compound as long as the photo-aligning of the photo alignment layer is not hindered. Examples of the additives include a polymerization initiator and a polymerization inhibitor.

It is advisable to select the polymerization initiator or the polymerization inhibitor appropriately from generally-known compounds in accordance with the kind of the photo dimerization-reactive compound and then use the selected one. The added amount of the polymerization initiator or the polymerization inhibitor is preferably from 0.001 to 20% by weight, more preferably from 0.1 to 5% by weight of the photo dimerization-reactive compound. If the added amount of the polymerization initiator or the polymerization inhibitor is too small, the polymerization may not be initiated (or inhibited). Conversely, if the amount is too large, the reaction may be hindered.

The following will describe the photo alignment method. First, the face of an electrode-formed substrate which is to oppose to a liquid crystal layer is coated with a coating solution in which the above-mentioned constituent material of the photo alignment layer is diluted with an organic solvent, and then the solution is dried. In this case, the content of the photo dimerization-reactive compound in the coating solution is preferably from 0.05 to 10% by weight, more preferably from 0.2 to 2% by weight. If the content of photo dimerization-reactive compound is too small, an appropriate anisotropy is not easily given to the photo alignment layer. Conversely, if the content is too large, the viscosity of the coating solution becomes so high that a homogeneous coat film is not easily formed.

The coating method which can be used is spin coating, roll coating, rod bar coating, spray coating, air knife coating, slot die coating, wire bar coating or the like.

The thickness of the polymer film obtained by the coating with the constituent material is preferably from 1 to 200 nm, more preferably from 3 to 100 nm. If the thickness of the polymer film is too small, a sufficient photoaligning may not be obtained. Conversely, if the thickness is too large, the alignment of the liquid crystal molecules may be disturbed and further costs therefor are not preferred.

The resultant polymer film causes photo-excited reaction by the light irradiation the polarization of which is controlled, whereby anisotropy can be given. The wavelength range of the radiated light should be appropriately selected in accordance with the constituent material of the used photo alignment layer, and is preferably the range of ultraviolet ray wavelengths, that is, the range of 100 to 400 nm, more preferably the range of 250 to 380 nm.

The direction of the polarization is not especially limited if the direction makes it possible to generate the photo-excited reaction, and is preferably in the range of 0 to 45° oblique to the substrate face, more preferably in the range of 20 to 45° oblique thereto since the aligned state of the ferroelectric liquid crystal can be made good.

(Second Photo Alignment Layer)

The following will describe the second photo alignment layer used in the present embodiment. As described above, the second photo alignment layer used in the embodiment is preferably a photo isomerizable material comprising a photo isomerization-reactive compound which generates photo isomerization reaction to give anisotropy to the photo alignment layer. The photo isomerization reaction means a phenomenon that a single compound is changed into some other isomer by the light irradiation. The use of such an optically isomerization-reactive material makes it possible to increase a stable isomer from plural isomers by the light irradiation, whereby anisotropy can easily be given to the photo alignment layer.

The photo isomerization-reactive compound is not limited to any especial kind if the compound is a material capable of giving anisotropy to the photo alignment layer by photo isomerization reaction, and is preferably a compound which has a dichroism having different absorptions according to the polarization direction thereof and generates photo isomerization reaction by the light irradiation. By generating the isomerization of the reactive site aligned in the polarization direction of the photo isomerization-reactive compound having such properties, anisotropy can easily be given to the photo alignment layer.

For the photo isomerization-reactive compound, the photo isomerization reaction is preferably the cis-trans isomerization reaction since any one of the cis-isomer and the trans-isomer increases by the light irradiation, whereby anisotropy can be given to the photo alignment layer.

Examples of the photo isomerization-reactive compound may be monomolecular compounds or polymerizable monomers polymerizable with light or heat. These should be appropriately selected in accordance with the kind of the used ferroelectric liquid crystal. It is preferable to use any one of the polymerizable monomers since the monomer gives anisotropy to the photo alignment layer by the light irradiation and subsequently the monomer is polymerized, whereby the anisotropy can be made stable. Of such polymerizable monomers, preferable is an acrylate monomer or methacrylate monomer since the monomer gives anisotropy to the photo alignment layer and subsequently the monomer can easily be polymerized in the state that the anisotropy is kept good.

The polymerizable monomer may be a monofunctional monomer or a polyfunctional monomer. A bifunctional monomer is preferable since the anisotropy of the photo alignment layer, based on the polymerization, becomes more stable.

Specific examples of such a photo isomerization-reactive compound include compounds having a cis-trans isomerization-reactive skeleton, such as an azobenzene skeleton or a stilbene skeleton.

In this case, the number of the cis-trans isomerization-reactive skeleton(s) may be one or more, and is preferably two since the alignment of the ferroelectric liquid crystal is easily controlled.

The cis-trans isomerization-reactive skeleton(s) may have a substituent in order to make interaction thereof with the liquid crystal molecules higher. The substituent is not limited to any especial kind if the substituent can make the interaction with the liquid crystal molecules high and further does not hinder the alignment of the cis-trans isomerization-reactive skeleton(s). Examples thereof include a carboxyl group, a sodium sulfonate group, and a hydroxyl group. These skeleton structures can be appropriately selected in accordance with the kind of the used ferroelectric liquid crystal.

The photo isomerization-reactive compound may have a group containing many π electrons in the molecule, such as an aromatic hydrocarbon group, besides the cis-trans isomerization-reactive skeleton in order to make the interaction with the liquid crystal molecules higher. The cis-trans isomerization-reactive skeleton and the aromatic hydrocarbon group may be bonded to each other through a bonding group. The bonding group is not limited to any especial kind if the group can make the interaction with the liquid crystal molecules high. Examples thereof include —COO—, —OCO—, —O—, —C≡C—, —CH$_2$—CH$_2$—, —CH$_2$O—, and —OCH$_2$—.

In the case of using a polymerizable monomer as the photo isomerization-reactive compound, it is preferable that the monomer has, as its side chain, the above-mentioned cis-trans isomerization-reactive skeleton. When the monomer has, as its side chain, the cis-trans isomerization-reactive skeleton, the advantageous effect of the anisotropy given to the photo alignment layer becomes larger and this compound becomes particularly suitable for the control of the alignment of the ferroelectric liquid crystal. In this case, it is preferable that the above-mentioned aromatic hydrocarbon group and the bonding group contained in the molecule are contained, together with the cis-trans isomerization-reactive skeleton, in the side chain so as to make the interaction with the liquid crystal molecules high.

The side chain of the polymerizable monomer may have, as a spacer, an aliphatic hydrocarbon group such as an alkylene group so that the cis-trans isomerization-reactive skeleton can easily be aligned.

Of the above-mentioned photo isomerization-reactive compounds of monomolecular compounds and polymerizable monomers as described above, any compound having in the molecule thereof an azobenzene skeleton is preferable as the photo isomerization-reactive compound. This is because the azobenzene skeleton interacts highly with the liquid crystal molecules and is particularly suitable for the control of the alignment of the ferroelectric liquid crystal since the skeleton contains many π electrons.

When the azobenzene skeleton is irradiated with linearly polarized ultraviolet rays, the azobenzene skeleton of a trans isomer, in which its molecule long axis is aligned in the polarization direction, is changed to the cis isomer thereof.

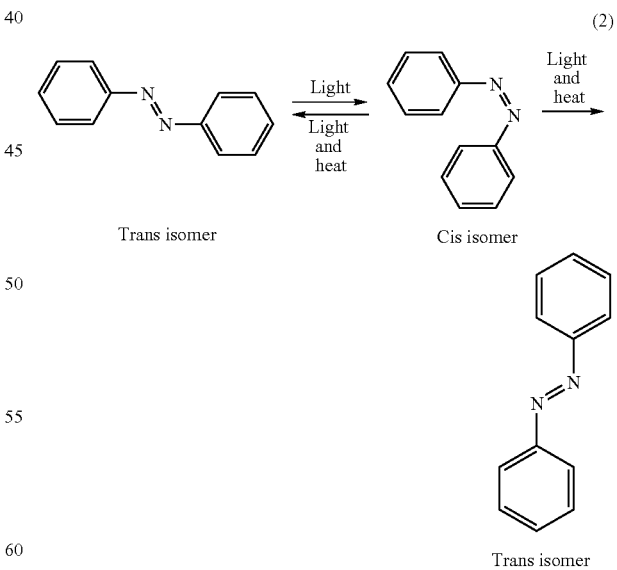

(2)

Since the cis isomer of the azobenzene skeleton is more chemically unstable than trans isomers thereof, the cis isomer returns thermally to any one of the trans isomers or absorbs visible rays to returns thereto. At this times it happens with the same possibility whether the cis isomer turns to the trans isomer at the left side or the trans isomer at the right side in the formula (2). Accordingly, when the azobenzene skeleton continues to absorb ultraviolet rays, the ratio of the trans isomer at the right side increases so that the average alignment direction of the azobenzene skeleton becomes perpendicular to the polarized ultraviolet ray direction. In the present invention, this phenomenon is used to make polarization directions of skeletons of azobenzene consistent with each other, thereby giving anisotropy to the photo alignment layer to control the alignment of liquid crystal molecules on the film.

An example of a monomolecular compound out of the compounds each having in the molecule thereof an azobenzene skeleton may be a compound represented by the following formula:

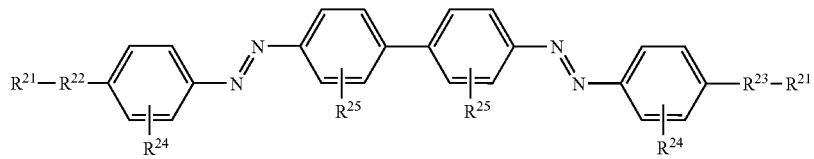

wherein $R^{21}$s each independently represent a hydroxyl group; $R^{22}$ represents a linking group represented by $-(\alpha-\beta-\alpha)_g-(\gamma)_h-$ and $R^{23}$ represents a linking group represented by $-(\gamma)_h-(\alpha-\beta-\alpha)_g-$, wherein α represents a bivalent hydrocarbon group, β represents —O—, —CO—O—, —OCO—, —CONH—, —NHCO—, —NHCO—O— or —OCONH—, g represents an integer of 0 to 3, γ represents a bivalent hydrocarbon group when g is 0 and represents —O—, —CO—O—, —OCO—, —CONH—, —NHCO—, —NHCO—O— or —OCONH— when g is an integer of 1 to 3, and h represents 0 or 1; $R^{24}$s each independently represent a halogen atom, a carboxyl group, a halogenated methyl group, a halogenated methoxy group, a cyano group, a nitro group, a methoxy group, or a methoxycarbonyl group provided that the carboxyl group may be combined with an alkali metal to form a salt; and $R^{25}$s each independently represent a carboxyl group, a sulfo group, a nitro group, an amino group or a hydroxyl group provided that the carboxyl group or the sulfo group may be combined with an alkali metal to form a salt.

Specific examples of the compound represented by the above-mentioned formula include the following compounds:

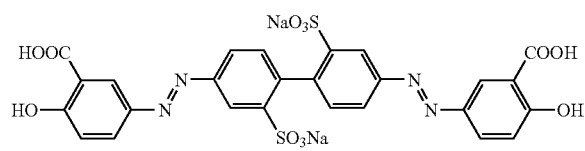

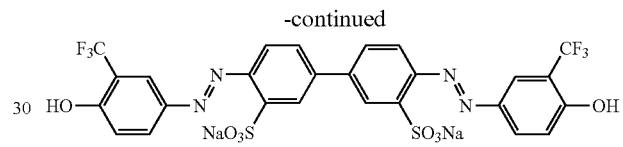

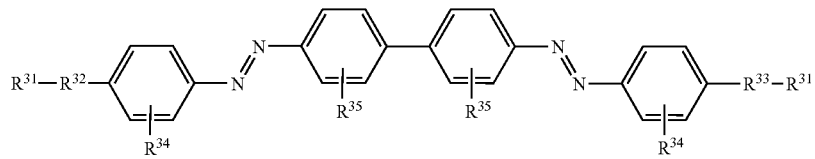

An example of the polymerizable monomer having in its side chain the azobenzene skeleton may be a compound represented by the following formula:

wherein $R^{31}$s each independently represent a (meth)acryloyloxy group, a (meth)acrylamide group, a vinyloxy group, a vinyloxycarbonyl group, a vinyliminocarbonyl group, a vinyliminocarbonyloxy group, a vinyl group, an isopropenyloxy group, an isopropenyloxycarbonyl group, an isopropenyliminocarbonyl group, an isopropenyliminocarbonyloxy group, an isopropenyl group or an epoxy group; $R^{32}$ represents a linking group represented by $-(\alpha-\beta-\alpha)_g-(\gamma)_h-$ and $R^{33}$ represents a linking group represented by $-(\gamma)_h-(\alpha-\beta-\alpha)_q-$ wherein α represents a bivalent hydrocarbon group, β represents —O—, —CO—O—, —OCO—, —CONH—, —NHCO—, —NHCO—O— or —OCONH—, g represents an integer of 0 to 3, γ represents a bivalent hydrocarbon group when g is 0 and represents —O—, —CO—O—, —OCO—, —CONH—, —NHCO—, —NHCO—O— or —OCONH— when g is an integer of 1 to 3, and h represents 0 or 1; $R^{34}$s each independently represent a halogen atom, a carboxyl group, a halogenated methyl group, a halogenated methoxy group, a cyano group, a nitro group, a methoxy group, or a methoxycarbonyl group provided that the carboxyl group may be combined with an alkali metal to form a salt; and $R^{25}$s each independently represent a carboxyl group, a sulfo group, a nitro group, an amino group or a hydroxyl group provided that the carboxyl group or the sulfo group may be combined with an alkali metal to form a salt.

A specific example of the compound represented by the above-mentioned formula is the following compound:

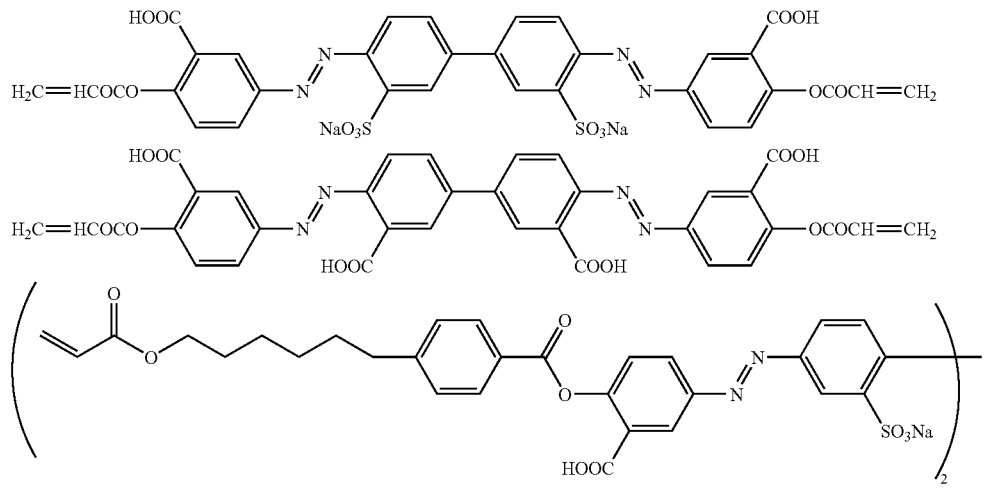

In the present embodiment, the cis-trans isomerization-reactive skeleton or substituent can be variously selected from the above-mentioned photo isomerization-reactive compounds in accordance with required properties. One kind of the photo isomerization-reactive compound may be used alone or a combination of two or more kinds thereof can be used.

Additives, besides the above-mentioned photo isomerization-reactive compound, may be contained as constituent materials of the second photo alignment layer used in the present embodiment as long as the photoaligning of the photo alignment layer is not hindered. In the case of using a polymerizable monomer as the photo isomerization-reactive compound, examples of the additives include a polymerization initiator and a polymerization inhibitor.

It is advisable to select the polymerization initiator or the polymerization inhibitor appropriately from generally-known compounds in accordance with the kind of the photo isomerization-reactive compound and then use the selected one. The added amount of the polymerization initiator or the polymerization inhibitor is preferably from 0.001 to 20% by weight, more preferably from 0.1 to 5% by weight of the photo isomerization-reactive compound. If the added amount of the polymerization initiator or the polymerization inhibitor is too small, the polymerization may not be initiated (or inhibited). Conversely, if the amount is too large, the reaction may be hindered.

The method for the optical alignment process of the second photo alignment layer can be performed in the same way as described about the first photo alignment layer. In his case, the content of the photo isomerization-reactive compound in the coating solution is preferably from 0.05 to 10% by weight, more preferably from 0.2 to 5% by weight. In the second photo alignment layer, the optical alignment process can also be conducted by radiating oblique non-polarized ultraviolet rays. The direction of the radiation of the light is not especially limited if the direction makes it possible to generate the photo-excited reaction, and is preferably in the range of 10 to 45° oblique to the substrate face, more preferably in the range of 30 to 45° oblique thereto since the aligned state of the ferroelectric liquid crystal can be made good. Furthermore, in the case of using a polymerizable monomer mentioned above as the photo isomerization-reactive compound, the optical alignment process is conducted in the same way as described about the first photo alignment layer, and then the monomer is heated, thereby polymerizing the monomer. In this way, the anisotropy given to the photo alignment layer can be made stable.

b. Second Embodiment

Since the photoreactive materials used preferably as the constituent materials for the first photo alignment layer and the second photo alignment layer in the second embodiment are same as those described for the "first photo alignment layer" of the first embodiment, explanation is omitted here. In particular, in this embodiment, it is preferable that the constituent material for the first photo alignment layer is a photoreactive material and the above-mentioned photo alignment layer shows the anisotropy by the photo dimerization reaction, and the constituent material for the second photo alignment layer is a photoreactive material and the above-mentioned photo alignment layer shows the anisotropy by the photo decomposition reaction. A combination of these materials is particularly suitable for the alignment control of the ferroelectric liquid crystal so that the ferroelectric liquid crystal can be aligned without generating the alignment defect such as the zigzag defect and the hairpin defect so as to provide a liquid crystal display showing the mono-stability operation mode.

(2) Liquid Crystal Layer

A liquid crystal layer used in the present invention is provided by sandwiching a ferroelectric liquid crystal between the above-mentioned photo alignment layers. In the present invention, the above-mentioned ferroelectric liquid crystal is a material showing the SmC* phase via the SmA phase in the temperature cooling process and showing the mono-stability in the SmC* phase.

The phase sequence of the ferroelectric liquid crystal used in the present invention is not particularly limited as long as it shows the SmC* phase via the SmA phase in the temperature cooling process, and it may show another liquid crystal phase on the high temperature side or the low temperature side of the liquid crystal phases. Among these examples, for the wide material selection range, it is preferable to use a material showing the SmC* phase from the Ch phase via the SmA phase. Such a ferroelectric liquid crystal can be selected variously from the commonly known materials according to the demanded characteristics.

Moreover, as such a ferroelectric liquid crystal, although a single material showing the SmC* phase can be used, a material showing the above-mentioned phase sequence by adding a small amount of a chital dopant not showing the SmC phase itself but capable of inducing the spontaneous polarization and an appropriate spiral pitch to a low viscosity non-chiral liquid crystal easily showing the SmC phase (hereinafter, it may be referred to as the host liquid crystal) is preferable for its low viscosity and capability of realizing a higher response.

The ferroelectric liquid crystal used in the invention is preferably one constituting a single phase. The word "constituting a single phase" means that a polymer network, as formed by the polymer stabilizing method or the like, is not formed. Such use of the ferroelectric liquid crystal of a single phase produces an advantage that the production process becomes simple and the driving voltage can be made low.

As the host liquid crystal, a material showing the SmC phase in a wide temperature range is preferable. Those commonly known as a host liquid crystal for a ferroelectric liquid crystal can be used without limitation particularly. For example, a compound represented by the below-mentioned general formula:

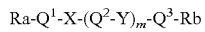

Ra-Q$^1$-X-(Q$^2$-Y)$_m$-Q$^3$-Rb (in the formula, Ra and Rb are each a straight chain or branched alkyl group, an alkoxy group, an alkoxy carbonyl group, an alkanoyloxy group or an alkoxy carbonyloxy group, Q$^1$, Q$^2$ and Q$^3$ are each a 1,4-phenylene group, a 1,4-cyclohexylene group, a pyridine-2,5-diyl group, a pyradine-2,5-diyl group, a pyridazine-3,6-diyl group or a 1,3-dioxane-2,5-diyl group, wherein these groups may have a substituent group such as a halogen atom, a hydroxyl group and a cyano group, X and Y are each —COO—, —OCO—, —CH$_2$O—, —OCH$_2$—, —CH$_2$CH$_2$—, —C≡C— or a single bond, and m is 0 or 1) can be used. As the host liquid crystal, the above-mentioned compounds can be used either alone by one kind or as a combination of two or more kinds.

The chital dopant to be added to the above-mentioned host liquid crystal is not particularly limited as long as it is a material having the large spontaneous polarization and the ability capable of inducing an appropriate spiral pitch, and thus those commonly known as a material to be added to a liquid crystal composition showing the SmC phase can be used. In particular, a material capable of inducing the large spontaneous polarization by a small addition amount is preferable. As such a chital dopant, for example, a compound represented by the below-mentioned general formula:

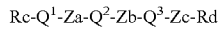

Rc-Q$^1$-Za-Q$^2$-Zb-Q$^3$-Zc-Rd (in the formula, Ra, Q$^1$, Q$^2$, Q$^3$ denote the same things as in the above-mentioned general formula, Za and Zb are —COO—, —OCO—, —CH$_2$O—, —OCH$_2$—, —CH$_2$CH$_2$—, —C≡C—, —CH=N—, —N=N—, —N(→O)=N—, —C(=O)S— or a single bond, Rc is a straight chain or branched alkyl group, which may have an asymmetric carbon atom, an alkoxy group, an alkoxy carbonyl group, an alkanoyloxy group or an alkoxy carbonyloxy group, Rd is a straight chain or branched alkyl group having an asymmetric carbon atom, an alkoxy group, an alkoxy carbonyl group, an alkanoyloxy group or an alkoxy carbonyloxy group, and Rc and Rd may be substituted with a halogen atom, a cyano group or a hydroxyl group) can be used. As the chital dopant, the above-mentioned compounds can be used either alone by one kind or as a combination of two or more kinds.

As the ferroelectric liquid crystal used in the present invention, specifically, "FELIXM4851-100" produced by Clariant (Japan) K.K., or the like can be presented.

The thickness of the liquid crystal layer made of the above-mentioned ferroelectric liquid crystal is preferably from 1.2 to 3.0 μm, more preferably from 1.3 to 2.5 μm, even more preferably from 1.4 to 2.0 μm. If the thickness of the liquid crystal layer is too small, the contrast may lower. Conversely, if the thickness is too large, the liquid crystal may not be aligned with ease.

As the method for forming the liquid crystal layer, a method which is generally used as a method for forming a liquid crystal cell can be used. For example, the liquid crystal layer can be formed, by making use of capillary effect to inject an isotropic liquid obtained by heating the above-mentioned ferroelectric liquid crystal into a liquid crystal cell, which is formed by forming electrodes beforehand on a substrate and arranging the above-mentioned photo alignment layer, and then sealing the cell with an adhesive agent. The thickness of the liquid crystal layer can be adjusted with spacers such as beads.

(3) Substrate

The substrate used in the invention is not limited to any especial kind if the substrate can be generally used as a substrate of liquid crystal display. Preferred examples thereof include glass plates and plastic plates. The surface roughness (RSM value) of the substrate is preferably 10 nm or less, more preferably 3 nm or less, even more preferably 1 nm or less. The surface roughness in the invention can be measured with an atomic force microscope (AFM).

(4) Electrode Layer

The electrode layer used in the invention are not limited to any especial kind if the electrode layer are electrode layer which are generally used as electrode layer of liquid crystal display. At least one of the electrode layers is preferably an electrode layer made of a transparent conductor. Preferred examples of the material of the transparent conductor include such as indium oxide, tin oxide, and indium tin oxide (ITO). In the case of rendering the liquid crystal display of the invention liquid crystal display of an active matrix system using TFT elements, one of upper and lower electrode layers is rendered a full-face common electrode made of the transparent conductor and the other is rendered an electrode in which x electrodes and y electrodes are arranged in a matrix form and a TFT element and a pixel electrode are arranged in a region surrounded by each of the x electrodes and each of the y electrodes. In this case, the difference between concave and convex portions of an electrode layer made of the pixel electrodes, the TFT elements, the x electrodes and the y electrodes is preferably 0.2 μm or less. If the difference between the concave and convex portions of the electrode layer is more than 0.2 μm, alignment disturbance is easily generated.

About the above-mentioned electrode layer, a transparent electroconductive film can be formed on the above-mentioned substrate by a vapor deposition method such as CVD, sputtering, or ion plating, and then this is patterned into a matrix form, whereby the x electrodes and the y electrodes can be obtained.

(5) Polarizing Plate

The polarizing plate used in the invention is not limited to any especial kind if the plate is a member for transmitting only a specific direction of wave motions of light. It is possible to use a member which is generally used as a polarizing plate for liquid crystal display.

2. Process for Producing Liquid Crystal Display

The liquid crystal display of the invention can be produced by a process that is generally used as a process for producing liquid crystal display. The following will describe a process for producing liquid crystal display of an active matrix system using TFT elements as one example of the process for producing the liquid crystal display of the invention. A transparent electroconductive film is first formed on a substrate by the above-mentioned vapor deposition method, so as to form a full-face common electrode. A transparent electroconductive film is patterned into a matrix form on another substrate to form x and y electrodes, and switching elements and pixel electrodes are set up.

Next, the two substrates, on which the electrodes are formed, are coated with photo alignment layer materials having different compositions, respectively, and then subjected to optical alignment process to form photo alignment layers. Beads are dispersed, as spacers, onto one of the thus-formed photo alignment layers, and a sealing agent is applied to the periphery thereof. The two substrates are stuck onto each other so as to make the photo alignment layers opposite to each other. The substrates are then thermally compressed. Capillary effect is used to inject a ferroelectric liquid crystal, in an isotropic liquid state, from an injecting port thereinto, and then the injecting port is sealed with an ultraviolet curable resin or the like. Thereafter, the ferroelectric liquid crystal is slowly cooled, whereby the liquid crystal can be aligned. Polarizing plates are stuck onto the upper and the lower of the thus-obtained liquid crystal cell, whereby liquid crystal display of the present invention can be yield.

3. Usage of a Liquid Crystal Display

A liquid crystal display of the present invention can be used as a color liquid crystal display by adopting a color filter system or a field sequential color system. According to the color liquid crystal display using a liquid crystal display of the present invention, since a ferroelectric liquid crystal can be aligned without generating an alignment defect such as a zigzag defect and a hairpin defect, the contract deterioration by the light leakage can be prevented. Moreover, the ferroelectric liquid crystal in the liquid crystal display of the present invention shows the mono-stability, enables the graduation display by the analog modulation, and provides a wide view angle and a high speed response so as to realize a highly precise color display. In particular, it is preferable to drive the liquid crystal display of the present invention by the field sequential color system. By adopting the field sequential color system, a bright color display of a low power consumption and a low cost can be obtained.

The present invention is not limited to the above-mentioned embodiments. The embodiments are examples, and all modifications having substantially the same structure and producing the same effects and advantages as the technical concept recited in the claims of the present invention are included in the technical scope of the invention.

EXAMPLES

The present invention will be described in more detail by way of the following examples. Compounds 1 to 4 represented by the following formulae were used as optically dimerization-reactive polymers and compounds i to v represented by the following formulae were used as photo isomerization-reactive compounds.

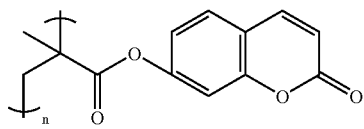

1

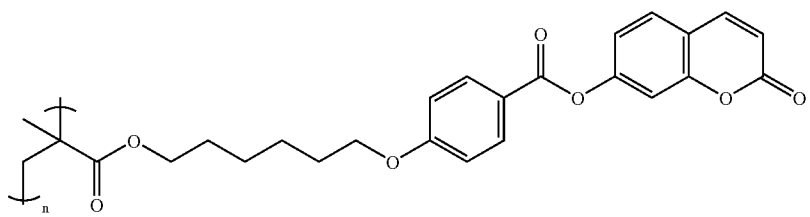

2

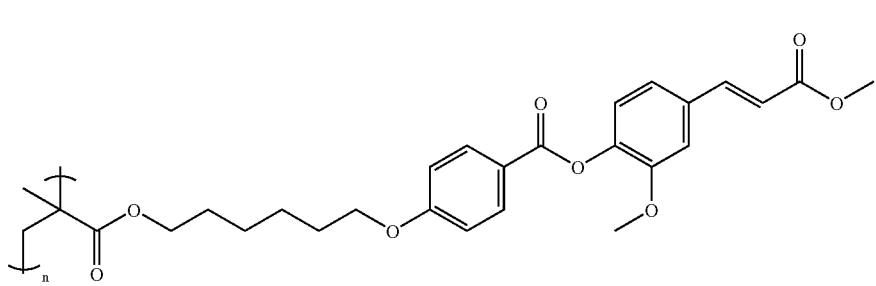

3

-continued

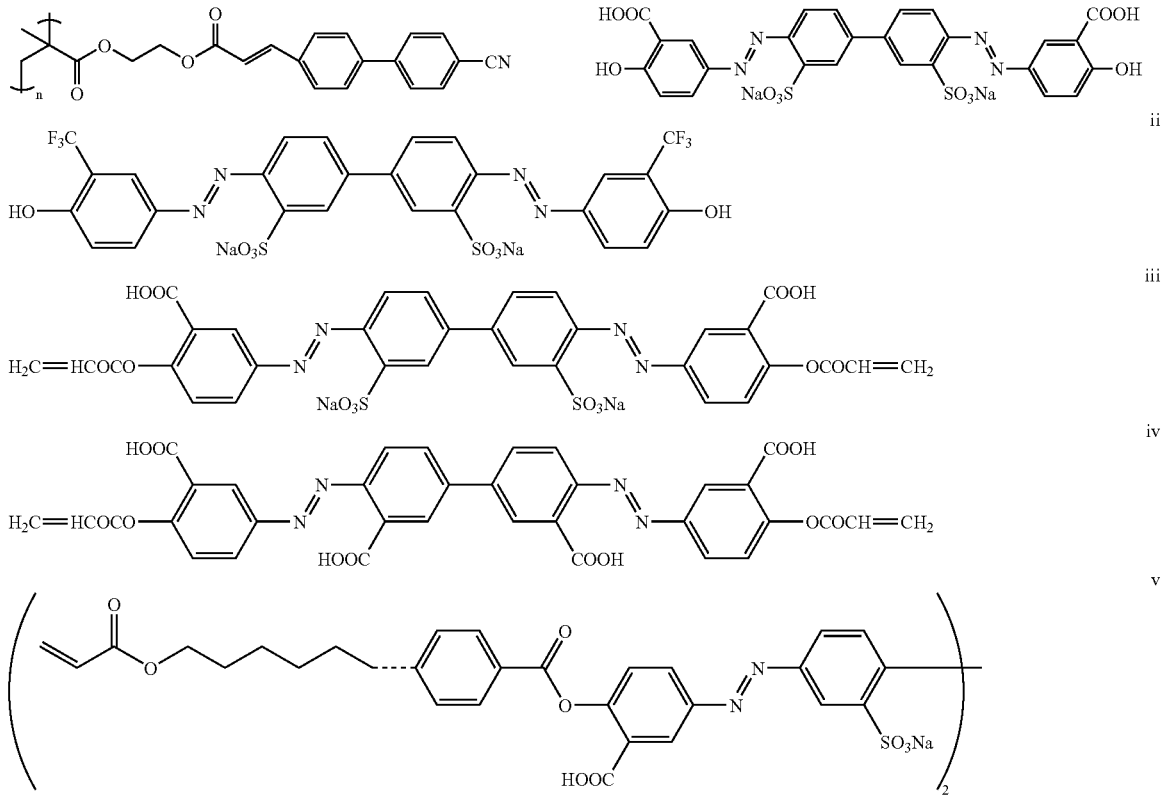

Example 1

Two glass substrates each coated with ITO were spin-coated with a 2% by weight solution of the compound 1 dissolved in cyclopentanone and a 1% by weight solution of the compound v dissolved in N-methyl-2-pyrrolidinone and 2-n-butoxyethanol (50:50% by weight), respectively, at a rotation number of 4000 rpm for 30 seconds. The substrate spin-coated with the solution of the compound 1 was dried at 180° C. in an oven for 10 minutes, and then polarized ultraviolet rays were radiated onto the substrate at 100 mJ/cm$^2$ from an angle 30° to the substrate face at 25° C. The substrate spin-coated with the solution of the compound v was dried at 100° C. in an oven for 1 minute, and then polarized ultraviolet rays were radiated onto the substrate at 1000 mJ/cm$^2$ and at 25° C. Thereafter, the resultant was heated at 150° C. under the atmosphere of nitrogen for 1 hour. Spacers of 1.5 μm size were sprayed onto one of the substrates, and a sealing material was applied onto the other substrate with a seal disperser. Thereafter, the substrates were fabricated in parallel to the radiation direction of the polarized ultraviolet rays and in an anti-parallel state, and then thermally compressed. As the liquid crystal, the "FELIXM4851-100" (manufactured by Clariant (Japan) K.K.) was used. The liquid crystal was attached to the upper of an injecting port thereof, and an oven was used to perform the injection of the liquid crystal at a temperature of 10 to 20° C. higher than the phase transition temperature between nematic and isotropic phases. The temperature was slowly returned to room temperature so that a mono-domain phase having no alignment defects was obtained.

Example 2

Two % by weight solutions dissolved in a cyclopentanone of the compound 1 and of a polyimide "RN1199" produced by NISSAN CHEMICAL INDUSTRIES, LTD. were each spin coated onto two glass substrates coated with an ITO for 30 seconds by a 4,000 rpm rotational frequency. As to the substrate spin coated with the polyimide "RN1199", by assembling a cell and injecting a liquid crystal in the same manner as in the above-mentioned example 1 except that it was exposed with a 100 J/cm$^2$ polarized ultraviolet ray, a mono-domain phase without the alignment defect can be obtained.

Comparative Example 1

A 2% by weight solution dissolved in a cyclopentanone of the compound 1 was spin coated onto two glass substrates coated with an ITO for 30 seconds by a 4,000 rpm rotational frequency. Furthermore, by exposing and drying in the same conditions as in the above-mentioned example 1 and assembling a cell, a mono-domain phase was not obtained and the alignment defects such as a zigzag defect and a hairpin defect were generated.

Comparative Example 2

Two glass substrates coated with ITO were each spin-coated with a 1% by weight solution of the compound v dissolved in N-methyl-2-pyrrolidinone and 2-n-butoxyethanol (50:50% by weight) at a rotation number of 4000 rpm for 30 seconds. Furthermore, by exposing and drying in the same conditions as in the above-mentioned example 1 and assembling a cell, a mono-domain phase was not obtained and the alignment defects such as a zigzag defect and a hairpin defect were generated.

Example 3

Two glass substrates each coated with ITO were spin-coated with a 2% by weight solution of the compound 1 dissolved in cyclopentanone and a 1% by weight solution of the compound i dissolved in N-methyl-2-pyrrolidinone and 2-n-butoxyethanol (50:50% by weight), respectively, at a rotation number of 4000 rpm for 30 seconds. The substrate spin-coated with the solution of the compound 1 was dried at 180° C. in an oven for 10 minutes, and then polarized ultraviolet rays were radiated onto the substrate at 100 mJ/cm$^2$ from an angle 30° to the substrate face at 25° C. The substrate spin-coated with the solution of the compound i was dried at 100° C. in an oven for 1 minute, and then polarized ultraviolet rays were radiated onto the substrate at 1000 mJ/cm$^2$ and at 25° C. Spacers of 1.5 μm size were sprayed onto one of the substrates, and a sealing material was applied onto the other substrate with a seal disperser. Thereafter, the substrates were fabricated in parallel to the radiation direction of the polarized ultraviolet rays and in an anti-parallel state, and then thermally compressed. As the liquid crystal, an "R2301" (manufactured by Clariant (Japan) K.K.) was used. The liquid crystal was attached to the upper of an injecting port thereof, and an oven was used to perform the injection of the liquid crystal at a temperature of 10 to 20° C. higher than the phase transition temperature between nematic and isotropic phases. The temperature was slowly returned to room temperature so that a mono-domain phase having no alignment defects was obtained.

Comparative Example 3

Two glass substrates coated with ITO were each spin-coated with a 2% by weight solution of the compound i dissolved in N-methyl-2-pyrrolidinone and 2-n-butoxyethanol (50:50% by weight) at a rotation number of 4000 rpm for 30 seconds. Furthermore, they were dried, subjected to exposure treatment and fabricated into a cell, and then the liquid crystal was injected thereinto under the above-mentioned conditions. As a result, no mono-domain phase was obtained, and alignment defects such as a double domain, a zigzag defect and a hairpin defect were generated.

Example 4

The same way as in Example 3 was performed except that the compound 2 was used instead of the compound 1 in Example 3. As a result, a mono-domain phase having no alignment defects was obtained.

Example 5

The same way as in Example 3 was performed except that the compound 3 was used instead of the compound 1 in Example 3. As a result, a mono-domain phase having no alignment defects was obtained.

Example 6

The same way as in Example 3 was performed except that the compound 4 was used instead of the compound 1 in Example 3. As a result, a mono-domain phase having no alignment defects was obtained.

Example 7

The same way as in Example 3 was performed except that the compound ii was used instead of the compound i in Example 3. As a result, a mono-domain phase having no alignment defects was obtained.

Example 8

Two glass substrates each coated with ITO were spin-coated with a 2% by weight solution of the compound 1 dissolved in cyclopentanone and a 1% by weight solution of the compound iii dissolved in N-methyl-2-pyrrolidinone and 2-n-butoxyethanol (50:50% by weight), respectively, at a rotation number of 4000 rpm for 30 seconds. The substrate spin-coated with the solution of the compound 1 was dried at 180° C. in an oven for 10 minutes, and then polarized ultraviolet rays were radiated onto the substrate at 100 mJ/cm$^2$ from an angle 30° to the substrate face at 25° C. The substrate spin-coated with the solution of the compound iii was dried at 100° C. in an oven for 1 minute, and then polarized ultraviolet rays were radiated onto the substrate at 1000 mJ/cm$^2$ and at 25° C. Thereafter, the resultant was heated at 150° C. under the atmosphere of nitrogen for 1 hour. Spacers of 1.5 μm size were sprayed onto one of the substrates, and a sealing material was applied onto the other substrate with a seal disperser. Thereafter, the substrates were fabricated in parallel to the radiation direction of the polarized ultraviolet rays and in an anti-parallel state, and then thermally compressed. As the liquid crystal, the "R2301" (manufactured by Clariant (Japan) K.K.) was used. The liquid crystal was attached to the upper of an injecting port thereof, and an oven was used to perform the injection of the liquid crystal at a temperature of 10 to 20° C. higher than the phase transition temperature between nematic and isotropic phases. The temperature was slowly returned to room temperature so that a mono-domain phase having no alignment defects was obtained.

Example 9

The same way as in Example 8 was performed except that the compound iv was used instead of the compound iii in Example 8. As a result, a mono-domain phase having no alignment defects was obtained.

What is claimed is:

1. A liquid crystal display comprising a first photo aligned substrate having a first substrate, an electrode layer formed on the first substrate, and a first photo alignment layer formed on the electrode layer, and a second photo aligned substrate having a second substrate, an electrode layer formed on the second substrate, and a second photo alignment layer formed on the electrode layer, disposed so as to have the first photo alignment layer and the second photo alignment layer face with each other, with a ferroelectric liquid crystal sandwiched between the first photo alignment layer and the second photo alignment layer, wherein constituent materials for the first photo alignment layer and the second photo alignment layer are mutually different, and the ferroelectric liquid crystal shows a chiral smectic C phase via a smectic A phase in a temperature cooling process, and it shows a mono-stability in the chiral smectic C phase.

2. The liquid crystal display according to claim 1, wherein a constituent material for the first photo alignment layer is a photoreactive material and the first photo alignment layer shows an anisotropy by a photoreaction, and the constituent material for the second photo alignment layer is a photo isomerizable material including a photo isomerization-reactive compound and the second photo alignment layer shows the anisotropy by a photo isomerization reaction.

3. The liquid crystal display according to claim 2, wherein the photo isomerization-reactive compound has a dichroism having different absorptions according to a polarization direction, and generates the photo isomerization reaction by a light irradiation.

4. The liquid crystal display according to claim 2, wherein the photo isomerization reaction is a cis-trans isomerization reaction.

5. The liquid crystal display according to claim 2, wherein the photo isomerization-reactive compound is a compound having an azobenzene skeleton in a molecule.

6. The liquid crystal display according to claim 2, wherein the photo isomerization-reactive compound is a monomer having an azobenzene skeleton represented by a below-mentioned formula as a side chain:

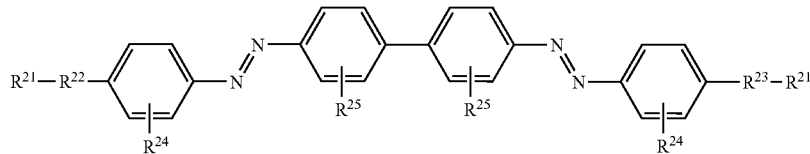

(In the formula, $R^{21}$s each independently are a hydroxyl group, $R^{22}$ is a linking group represented by $-(\alpha-\beta-\alpha)_g-(\gamma)_h-$, and $R^{23}$ is a linking group represented by $-(\gamma)_h-(\alpha-\beta-\alpha)_g-$. Here, $\alpha$ is a bivalent hydrocarbon group, $\beta$ is —O—, —CO—O—, —OCO—, —CONH—, —NHCO—, —NHCO—O—, or —OCONH—, and g is an integer from 0 to 3. $\gamma$ is the bivalent hydrocarbon group in a case g is 0, and it is —O—, —CO—O—, —OCO—, —CONH—, —NHCO—, —NHCO—O—, or —CONH— in the case g is the integer from 1 to 3, and h is 0 or 1. $R^{24}$s each independently are a halogen atom, a carboxyl group, a halogenated methyl group, a halogenated methoxy group, a cyano group, a nitro group, a methoxy group, or a methoxycarbonyl group. However, the carboxyl group may form a salt with an alkali metal. $R^{25}$s each independently are the carboxyl group, a sulfo group, a nitro group, an amino group or a hydroxyl group. However, the carboxyl group or the sulfo group may form the salt with the alkali metal).

7. The liquid crystal display according to claim 2, wherein the photo isomerization-reactive compound is a polymerizable monomer having an azobenzene skeleton as a side chain.

8. The liquid crystal display according to claim 2, wherein the photo isomerization-reactive compound is a polymerizable monomer having an azobenzene skeleton represented by a below-mentioned formula as a side chain:

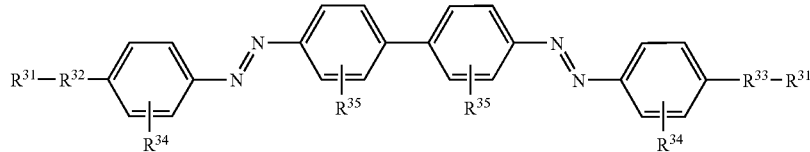

(in the formula, $R^{31}$s are each independently a (meth)acryloyloxy group, a (meth)acrylamide group, a vinyloxy group, a vinyloxy carbonyl group, a vinyliminocarbonyl group, a vinyliminocarbonyloxy group, a vinyl group, an isopropenyloxy group, an isopropenyloxycarbonyl group, an isopropenyliminocarbonyl group, an isopropenyliminocarbonyloxy group, an isopropenyl group, or an epoxy group. $R^{32}$ is a linking group represented by $-(\alpha-\beta-\alpha)_g-(\gamma)_h-$, and $R^{33}$ is a linking group represented by $-(\gamma)_h-(\alpha-\beta-\alpha)_g-$. Here, $\alpha$ is a bivalent hydrocarbon group, $\beta$ is —O—, —CO—O—, —OCO—, —CONH—, —NHCO—, —NHCO—O—, or —OCONH—, and g is an integer from 0 to 3. $\gamma$ is the bivalent hydrocarbon group in a case g is 0, and it is —O—, —CO—O—, —OCO—, —CONH—, —NHCO—, —NHCO—O—, or —OCONH— in the case g is the integer from 1 to 3, and h is 0 or 1. $R^{34}$s each independently are a halogen atom, a carboxyl group, a halogenated methyl group, a halogenated methoxy group, a cyano group, a nitro group, a methoxy group, or a methoxycarbonyl group. However, the carboxyl group may form a salt with an alkali metal. $R^{25}$s each independently are the carboxyl group, a sulfo group, the nitro group, an amino group or a hydroxyl group. However, the carboxyl group or the sulfo group may form a salt with an alkali metal).

9. The liquid crystal display according to claim 1, wherein the constituent materials for the first photo alignment layer and the second photo alignment layer are photoreactive material and photo alignment layers show an anisotropy by a photoreaction.

10. The liquid crystal display according to claim 9, wherein a constituent material for the first photo alignment layer is the photoreactive material and the first photo alignment layer shows the anisotropy by a photo dimerization reaction, and the constituent material for the second photo alignment layer is the photoreactive material and the second photo alignment layer shows the anisotropy by a photo decomposition reaction.

11. The liquid crystal display according to claim 2, wherein the photoreaction is a photo dimerization reaction or a photo decomposition reaction.

12. The liquid crystal display according to claim 11, wherein the photo reactive layer shows the anisotropy by the photo dimerization reaction and the photoreactive material has a radically polymerizable functional group and includes a photo dimerization-reactive compound with a dichroism having different absorptions according to a polarization direction.

13. The liquid crystal display according to claim 12, wherein the photo dimerization-reactive compound is a dimerization-reactive polymer including as a side chain any of a cinnamic acid ester, a coumalin or a quinoline.

14. The liquid crystal display according to claim 12, wherein the photo dimerization-reactive compound is at least one selected from a group consisting of dimerization-reactive polymers represented by a below-mentioned formulae:

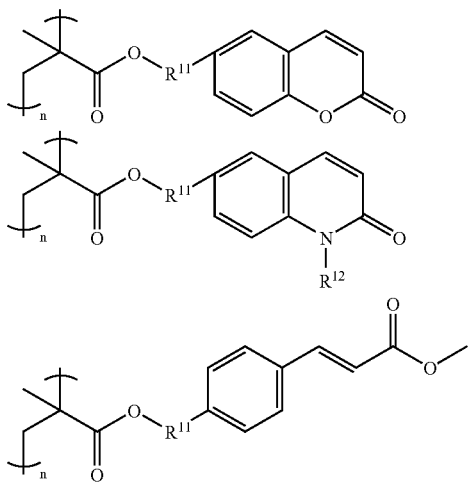

-continued $R^{11}$: —$A^1$—($Z^{11}$—$B^1$)$_t$—$Z^{12}$— wherein $A^1$ and $B^1$: 1,4-phenylene, a covalent single bond, pyridine-2,5-diyl, pyrimidine-2,5-diyl, 1,4-cyclohexylene or 1,3-dioxane-2,5-diyl;

$Z^{11}$ and $Z^{12}$: —$CH_2$—$CH_2$—, —COO—, —OOC—, or a covalent single bond; and t: an integer of 0 to 4

$R^{12}$: a lower alkyl n: the integer of 4 to 30,000.

15. The liquid crystal display according to claim 1, wherein the ferroelectric liquid crystal provides a single phase.

16. The liquid crystal display according to claim 1, to be driven by an active matrix system using thin film transistors.

17. The liquid crystal display according to claim 1, to be driven by a field sequential color system.

\* \* \* \* \*